(12) United States Patent
Aaron et al.

(10) Patent No.: US 10,090,105 B2
(45) Date of Patent: Oct. 2, 2018

(54) METHODS FOR DESIGNING AND MANUFACTURING TRANSFORMERS

(71) Applicant: Transformers LLC, San Francisco, CA (US)

(72) Inventors: Jack Aaron, Lake Forest, CA (US); Herb Shapiro, Laguna Niguel, CA (US); Robert Johnson, Bellflower, CA (US)

(73) Assignee: Transformer LLC, San Francisco, CA (US)

( * ) Notice: Subject to any disclaimer, the term of this patent is extended or adjusted under 35 U.S.C. 154(b) by 213 days.

(21) Appl. No.: 15/141,794

(22) Filed: Apr. 28, 2016

(65) Prior Publication Data

US 2016/0307699 A1    Oct. 20, 2016

Related U.S. Application Data

(63) Continuation of application No. 14/522,195, filed on Oct. 23, 2014, now Pat. No. 9,355,770.

(Continued)

(51) Int. Cl.
*H01F 7/06*    (2006.01)
*H01F 41/064*  (2016.01)

(Continued)

(52) U.S. Cl.
CPC ....... *H01F 41/064* (2016.01); *G06F 17/5063* (2013.01); *G06F 17/5068* (2013.01); *G06F 17/5081* (2013.01); *H01F 3/10* (2013.01); *H01F 27/24* (2013.01); *H01F 27/245* (2013.01); *H01F 27/28* (2013.01); *H01F 27/2823* (2013.01); *H01F 27/325* (2013.01);

(Continued)

(58) Field of Classification Search
CPC .... H01F 27/325; H01F 27/24; H01F 27/2895; H01F 17/062; H01F 41/02; H01F 41/08; H01F 5/00; Y10T 29/4902; Y10T 29/49069; Y10T 29/49071; Y10T 29/49073
USPC .................................. 29/605, 604, 606, 607
See application file for complete search history.

(56) References Cited

U.S. PATENT DOCUMENTS

| | | | |
|---|---|---|---|
| 6,509,822 B2 * | 1/2003 | Junjie | H01F 5/04 336/192 |
| 2007/0261231 A1 * | 11/2007 | Bosley | H01F 1/14741 29/604 |

* cited by examiner

*Primary Examiner* — Thiem Phan
(74) *Attorney, Agent, or Firm* — Brian Billett

(57) ABSTRACT

Disclosed is an electrical transformer for improved transformer power capacity and efficiency designed by the application of disclosed design considerations. One embodiment design consideration is a method to configure power transformer windings wherein the minimum distance of the primary windings from the winding axis/core center is greater (the primary windings are more distal) from the winding axis than the minimum distance of the secondary windings, which are wound around the minimum interior core diameter. This design consideration is extended from single bobbin transformer designs to split bobbin designs, with the requisite distal increase of the primary windings (from the core axis) geometrically provided by an enlarged core bobbin center leg (axial) dimension beneath the primary winding window. Another disclosed design consideration is to fix the primary winding length relationship to the core weight for given transformer specifications in accordance with the disclosed unexpected experimental results and formula.

4 Claims, 7 Drawing Sheets

Related U.S. Application Data

(60) Provisional application No. 61/982,846, filed on Apr. 22, 2014.

(51) Int. Cl.
*H01F 27/245* (2006.01)
*H01F 27/28* (2006.01)
*G06F 17/50* (2006.01)
*H01F 3/10* (2006.01)
*H01F 27/32* (2006.01)
*H01F 41/079* (2016.01)
*H01F 27/24* (2006.01)

(52) U.S. Cl.
CPC ....... *H01F 41/079* (2016.01); *G06F 2217/02* (2013.01); *G06F 2217/06* (2013.01); *G06F 2217/08* (2013.01); *G06F 2217/78* (2013.01); *Y02E 40/76* (2013.01); *Y04S 10/545* (2013.01); *Y10T 29/49071* (2015.01)

| Core Weight (lbs.) | Optimized Primary winding length (in.) |
|---|---|
| 0.033 | 5150 |
| 0.110 | 5050 |
| 0.225 | 4770 |
| 0.470 | 3990 |
| 0.730 | 3720 |
| 1.090 | 3380 |
| 1.550 | 2960 |
| 2.290 | 2790 |
| 3.075 | 2620 |
| 4.090 | 2450 |
| 4.250 | 2430 |
| 5.370 | 2280 |
| 6.800 | 2150 |
| 8.825 | 1940 |

Fig. 1A

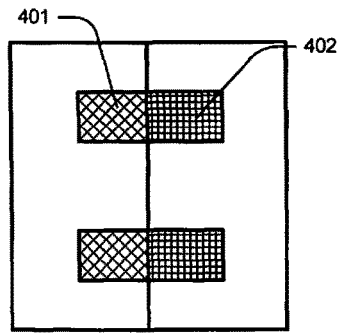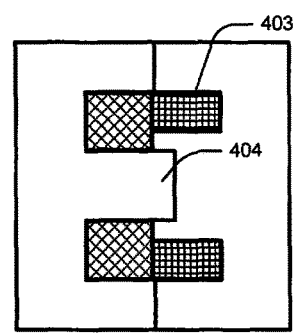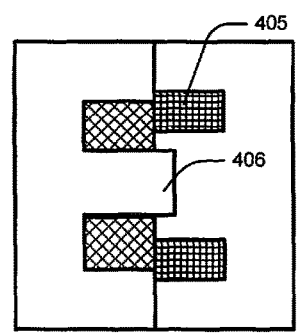
Prior Art
Fig. 4A
Fig. 4B
Fig. 4C
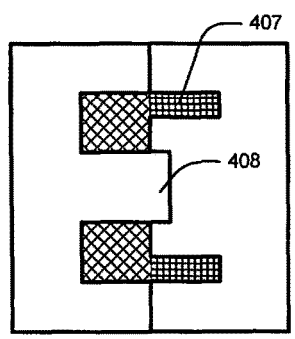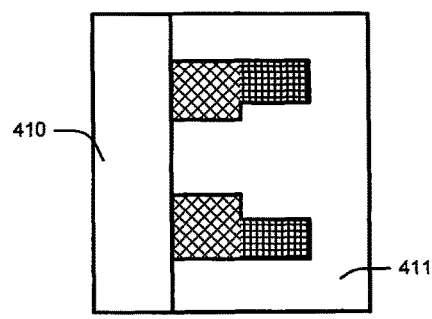
Fig. 4D
Fig. 4E

METHODS FOR DESIGNING AND MANUFACTURING TRANSFORMERS

RELATED APPLICATIONS

This application claims the benefit of U.S. provisional application 61/982,846 filed on Apr. 22, 2014. This application is a continuation of and claims the benefit of U.S. non-provisional application Ser. No. 14/522,195 filed on Oct. 22, 2014. Both applications are incorporated herein in their entirety.

FIELD OF THE INVENTION

The field of the invention is electrical transformer design, specifically the optimization of transformer core and winding configurations for improved system power characteristics.

BACKGROUND

The natural link between electricity and magnetism may be explained in part by a phenomenon known as magnetic flux. Electric current passing through an electrical conductor may induce magnetic flux in a proximate magnetic material. This induced magnetic flux may then be carried through a magnetic flux conductor to induce a second, electrically insulated current in an isolated proximate electrical conductor. This link between an electrically forced primary circuit, and a magnetic flux coupled but electrically insulated secondary electrical conductive circuit has been well studied—including countless configurations of the electrical conductors (windings) and the magnetic component (core). These properties of electromagnetism are used extensively to distribute energy by electric transmission lines. Generated electric energy (at low voltages) may be converted efficiently by inductive transformers to very high voltages which can be carried over long distances with minimal resistive heat losses, and then transformed similarly back to various much lower useful voltages for operating our world of countless electrically driven devices.

Improvement in the electrical power transmission capacity and efficiency by any fundamental variations of transformer winding (electrical conduction) or core configuration (magnetic flux), given the historic amount of study in this field would be a substantially unexpected result.

The long history of electricity transformer designs includes considerable efforts placed upon the configuration of the magnetic flux carrying segments of a transformer, also known as its core.

One of the oldest and most common configurations for transformers is an E-core transformer, which consists of many flat "E" shaped layers or laminations of magnetic material electrically insulated from adjacent layers to reduce eddy currents in the core. An insulated "I" shaped set of core laminations is the abutted to the "E" to form an "E-I" magnetic core.

Typical and well-known E core configuration transformers utilize the center leg of the E core to host both the primary and secondary windings. Conventional transformer configurations are commonly designed with the primary (high voltage) winding axially proximate to the core center axis, and the secondary (low voltage) winding wound on top of the primary winding. Non-magnetic and electrically insulating "bobbins" are generally used for electrical safety and to facilitate manufacturing. The electrical windings are spun onto the bobbins, which are then slid or pushed onto the selected core segment. A common bobbin configuration which is known as a "split" bobbin, separates and insulates the primary and secondary windings laterally from each other on the core center leg. Windings may consist of electrical wire wound around the core, or electrically conductive thin ribbons wrapped around the core.

SUMMARY

Disclosed is an electrical power transformer design and design method for improved transformer power capacity and efficiency by the application of disclosed design considerations consistent with the invention A disclosed embodiment design consideration is a method for the optimized selection of a primary winding length for a given set of modem commercial transformer core lamination geometries.

Another embodiment design consideration is a method to configure step-down power transformer windings wherein the minimum distance of the primary windings from the winding axis/core center is greater (the primary windings are more distal) from the winding axis than the minimum distance of the secondary windings, which are wound around the minimum interior core diameter.

This design consideration is extended from single segment or single bobbin transformer designs to split bobbin designs, with the aforementioned distal increase of the primary windings (from the core axis) geometrically provided by an enlarged core center leg (axial) dimension beneath the primary winding window. This design consideration may also be provided by a split bobbin with a greater axial spacing underneath the primary winding.

Another disclosed design consideration is to fix the (optimal or ideal) primary winding length relationship to the core weight (within design proportions and of optimum permeability) in accordance with the disclosed unexpected experimental results. For both disclosed design considerations, the secondary winding length is determined according to the well-known corollary of Faraday's law which equates the ratio of primary and secondary winding length (generally expressed as a number of winding turns) and the primary and secondary voltage levels, or Np/Ns VpVs, in order to meet output voltage requirements (the efficiency correlation parameter is omitted as it does not impact the ratio relationship). The secondary winding gauge (thickness) is then determined to meet power requirements for the system. Unexpectedly, this configuration reversal for the windings from a conventional design, such that when the primary winding length is held constant, the resultant component modification creates additional space for the windings within the core window, which allows larger gauge windings to be used for the same output voltage and thus provides greater power handling capacity for the transformer.

The experimental results and experimentally derived results for an optimized primary winding length matched to a given core weight are disclosed for a given range, configuration and set of transformer specifications. This relationship is identified analytically and extended illustratively to a defined range of potential transformer designs.

Such unexpected results and corresponding design considerations have in one embodiment been extended by a regressive natural logarithm curve fit to the experimental and experimentally derived data points disclosed. A best-fit curve by a natural logarithm relationship was selected based on the empirically illuminated process as asymptotic for these design factors. This relationship is extended by disclosed factors for a variety of transformer specifications.

BRIEF DESCRIPTION OF THE DRAWINGS

FIG. 1A—Chart showing an optimized primary winding lengths for core weights with the given specifications.

FIG. 4A—Cross section/top view of core laminations for split bobbin transformers in typical prior art E-E type transformers.

FIG. 4B-4F—Cross section/top view of core laminations for split bobbin transformers with primary and secondary winding configurations surrounding the modified split dimension center leg of the core. FIGS. 4A-4D show modified E-E type transformer cores.

FIG. 4E shows a modified E-I type transformer core.

FIG. 4F shows a standard E-I type transformer core with a modified split bobbin.

DETAILED DESCRIPTION

Disclosed are several embodiments including various transformer configurations and design considerations which when followed result in improved power capacity over the conventional design approaches for transformers.

Conventional single bobbin transformer designs based on a E-I configuration of core laminations are represented by a set of transformer cores from Tempel Manufacturing, identified by Tempel catalog part numbers as EI-X where X identifies the core geometry according to Tempel specifications. Based upon empirical and empirically derived results, the primary winding lengths for optimal power efficiency in step-down configurations of transformers based upon these core lamination geometries was determined. As a generalized and unexpected result, the length of the primary winding was found to be the driving factor for determining the optimal transformer configuration. Design considerations based upon this driving factor were then considered and optimal configurations are disclosed. As discussed below, certain design considerations apply to both step-up and step-down configurations.

Figure 1B:
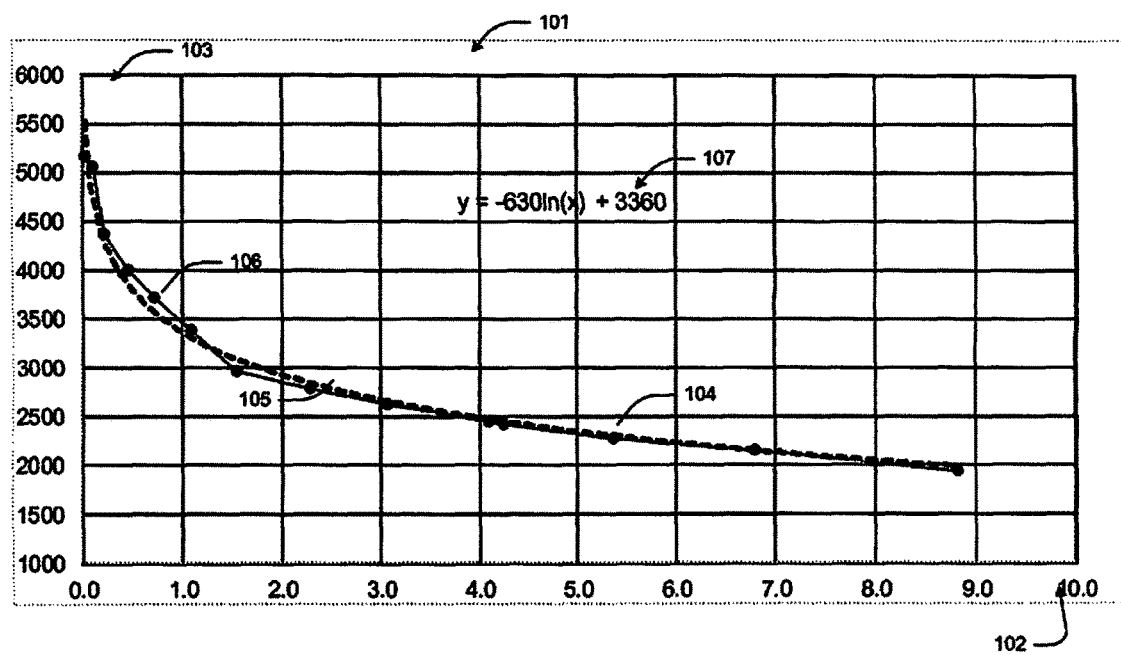
FIG. 1B—Empirically obtained and derived data points for optimal primary winding lengths vs. core weight with corresponding curve fit natural logarithm function.

FIG. 1A is a chart of the optimal primary winding lengths determined based on core weights for the transformer with core characteristics specified herein. These values are graphed 101 in FIG. 1B with the core weight (in pounds) shown on the x-axis 102, and the functional output—the optimal primary winding length (in inches) is shown on the y-axis 103. Exemplar data points are shown 104 106 which are connected by a solid line. The determined data points are regressively curve fit to a natural logarithm function which reflects the asymptotic relationship of the data. The determined curve fit for calculating the optimal primary winding length in inches is shown 105 by a dashed line and the equation $y=-630*\ln(x)+3360$ identified as 107. Converted to feet of primary winding length, the relationship is $y=-52.5*\ln(x)+280$. Units for x is pounds (lbs) of core weight, and units for y is feet of primary winding length.

For this embodiment, once the primary length is determined, the secondary winding length may be determined according to the ratio of input and output voltages equivalency to input and output winding turns. As described below, for various embodiments when the primary winding is located an increased axial distance from the core center, if the length of the primary remains constant, the number of turns around the core decreases. Since the number of primary winding turns decreases for a given configuration, the number of secondary winding turns must decrease in order to maintain the input to output ratio of turns (as specified by the input and output voltages).

For this embodiment, the specified input voltage is 120 volts and the specified output voltage is 24 volts. Core laminations for this embodiment are specified as grade M 19 according to industry standards for the core material characteristics known as the AISI Grade—per the American Iron and Steel Institute (AISI) Designation. The maximum temperature (the target temperature after 2 hours of operation) for this embodiment is 200° F., and the material for the windings is specified to be copper. Input and output or primary and secondary voltages operate at a specified frequency, in these embodiments 60 Hz.

Other embodiments for determining the primary winding length may be readily derived from the optimized relationship from FIGS. 1A and 1B according to several known and empirically derived relationship. Among these are that the primary winding length is directly proportional to the primary winding voltage, and inversely proportional to the gauge of the primary winding. In one embodiment, the coefficient of the voltage to length relationship is 1, so for an input voltage of 240 volts as compared to the specified input voltage of 120 volts, the primary winding length is doubled. Also in this embodiment, the gauge of the primary winding is reduced such that the cross sectional area (measured in circular mils) is reduced by one-half.

In other embodiments in accordance with the optimized relationship from FIGS. 1A and 1B, the primary winding length is inversely proportional to the industry standard allowable temperature. The coefficient for the relationship has a default of 1 with the value to be optimized empirically. In other embodiments, the input idle current specified is inversely proportional to primary winding length. The coefficient for the relationship has a default of 1 with the value to be optimized empirically. In embodiments which utilize aluminum as the specified winding material instead of copper, a significant power capacity loss must be factored as a design consideration. In embodiments with aluminum windings, the primary length is unchanged. In embodiments which utilize a core configured with magnetic material of various M grades according to AISI designation, the output power capacity may be increased or decreased according to the core material, and according to embodiments with alternate core materials, the primary winding length is unchanged; other transformer characteristics may be adjusted to meet power requirements for these embodiments.

Figure 2A:
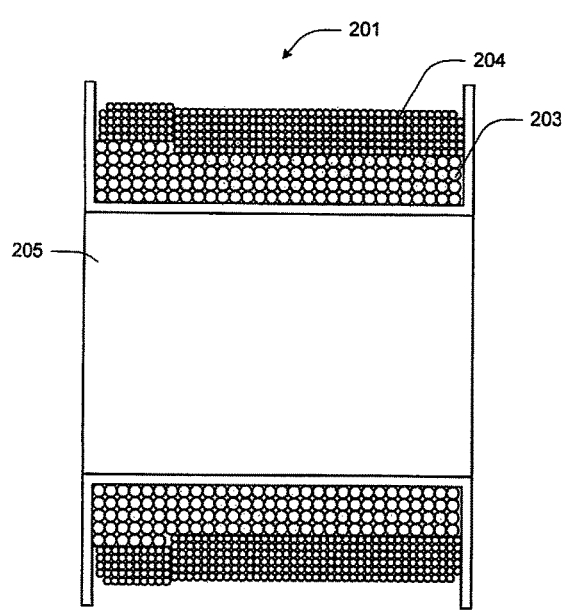
FIG. 2A—Cross section/top view of lamination for E core type single bobbin transformer showing winding configuration surrounding center leg of the core.
Figure 2B:
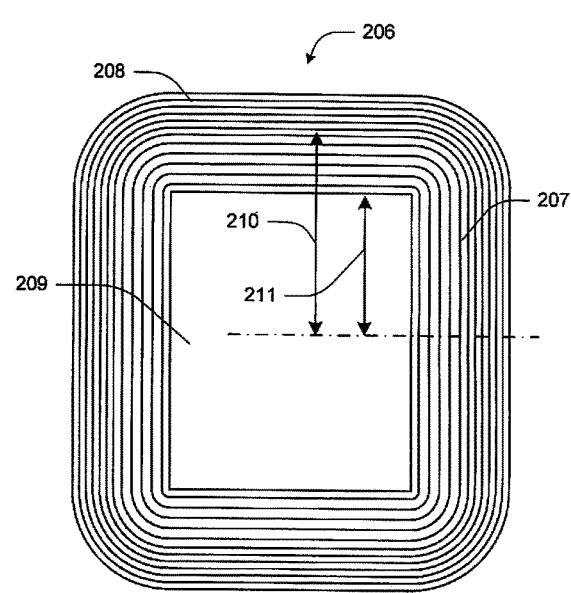
FIG. 2B—Cross section/plan view of E core type single bobbin transformer showing winding configuration surrounding center leg of the transformer core.

Single bobbin transformer designs are commonly configured with the primary and secondary windings wound around a single core segment. For step down transformers, the primary or high voltage winding is typically wound closer to the core segment center axis, with the secondary, or low voltage winding wound outside the primary winding. By empirical and empirically derived analysis, the unexpected result of improved power capacity was obtained for transformer configurations wherein the primary winding (high voltage) is wound outside the secondary winding (low voltage). FIG. 2A shows a cross section 201 of the center leg 205 of an E geometry transformer core or otherwise configured single bobbin transformer. In this embodiment, the primary (high voltage) winding 204 and secondary (low voltage) winding 203 cross-sectional areas are comparable as is typical for conventional transformer designs. FIG. 2B shows the same optimized single bobbin configuration 206 from the plan view perspective, or looking end-on at the core segment 209 acting as the windings bobbin. The primary (high voltage) windings 208 and secondary (low voltage) windings 207 are shown configured according to this embodiment, wherein the primary winding minimum axial distance from the core center 210 is greater than the secondary winding minimum winding axial distance 211.

For the specific configuration of the embodiment shown in FIG. 2A, the primary winding 19.5 gauge wire and 282 turns, with the secondary winding 15.5 gauge wire with a total of 126 turns.

Locating the primary winding further from the core axial center of a comparable transformer configuration provides the unexpected utility of increased power capacity. For such embodiments when the primary winding is located at increased axial distance from the core center, if the length of the primary winding remains constant, the number of turns around the core decreases. Since the number of primary winding turns decreases for a given configuration, the number of secondary winding turns must decrease in order to maintain the input to output ratio of turns (as specified by the input and output voltages). When the number of secondary windings is decreased, the length of the secondary winding consequently decreases, and the amount of space occupied by the primary and secondary windings in the core window decreases. The increased available space for the windings in the window may then be utilized by larger gauge windings, increasing the power capacity. This design consideration is extended to other configurations for the transformer as disclosed herein, but should not be construed to be limited to these disclosed embodiments as other will be apparent to those skilled in the art.

Figure 3:
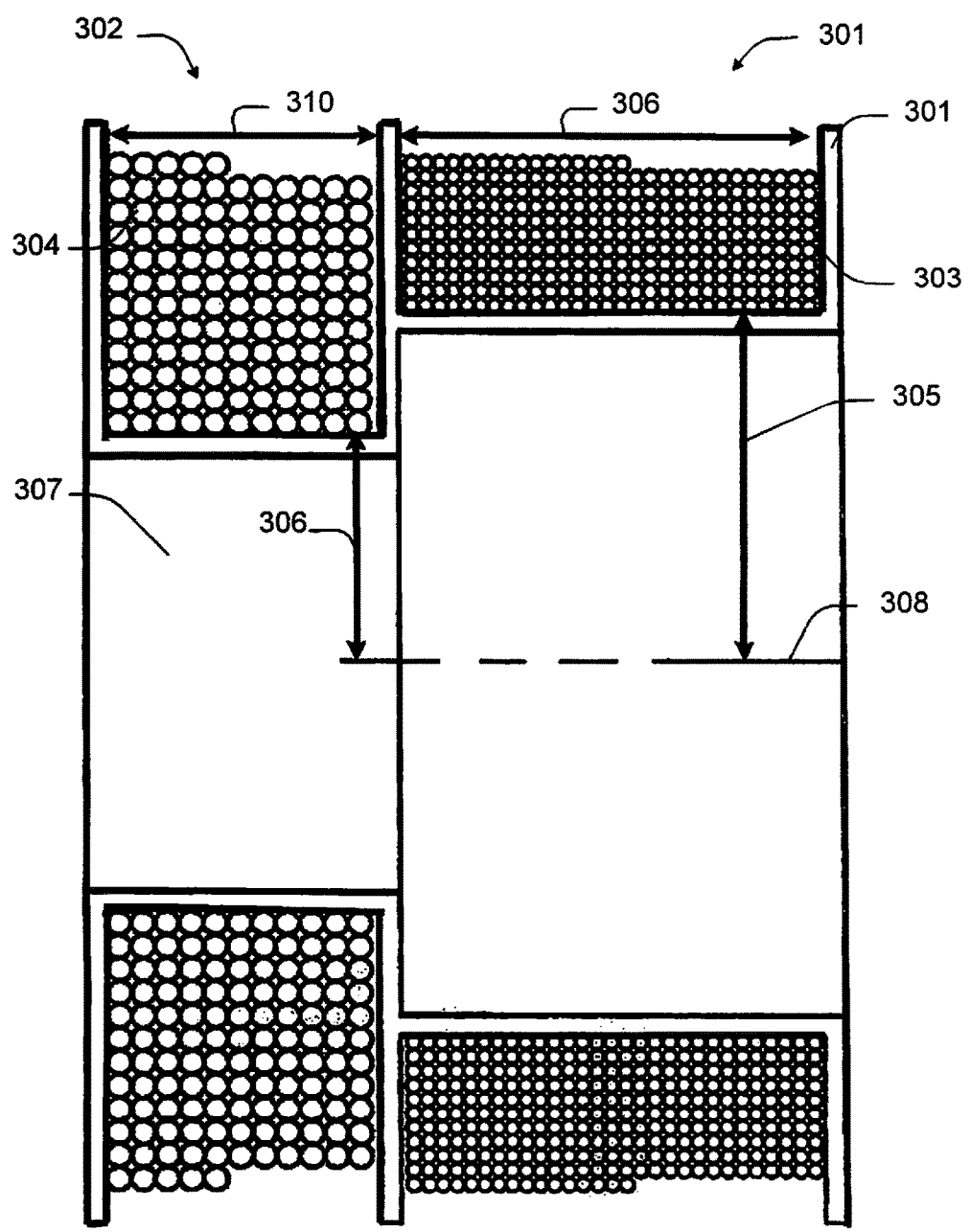
FIG. 3—Cross section/top view of lamination for modified E core type split bobbin transformer showing primary and secondary winding configurations surrounding the modified split dimension center leg of the core.

Split bobbin transformer designs are commonly configured with a core geometry that isolates the primary and secondary windings onto adjacent bobbins surrounding the same core segment. In conventionally designed split bobbins with this configuration, the core center leg segment, which extends through both bobbins, has a given cross section dimension, diameter, or width. In an embodiment of the invention, split bobbin transformers with both bobbins surrounding the same core segment, the core is configured with multiple such widths, which effectively increases the primary winding minimum axial distance from the core center as compared to the secondary winding minimum winding axial distance. FIG. 3 shows a cross-section view of a split-bobbin configuration consistent with this embodiment. Shown in FIG. 3, are the primary (high voltage) bobbin 301 and secondary (low voltage) bobbin 302 which are shown with the respective primary windings 303 and secondary windings 304 in place. Also shown in FIG. 3 is an exemplary configuration of the winding core 307 which positions the split bobbins 301 and 302 with the chosen differential minimum axial winding distance 305 and 306 for the primary and secondary windings from the core center axis 308. Also in accordance with this embodiment configuration, the split bobbin window widths 309 and 310, may be adjusted to compensate for the change in window height such that the winding windows are of comparable cross-section areas.

For the specific configuration of the embodiment shown in FIG. 3, the primary winding 19.5-gauge wire, wound at a width in the winding window 28 winding turns across for a total of 306 turns. The secondary winding shown is 15.5-gauge wire with a winding window width of 11 windings across for a total of 126 turns.

Figure 4F:
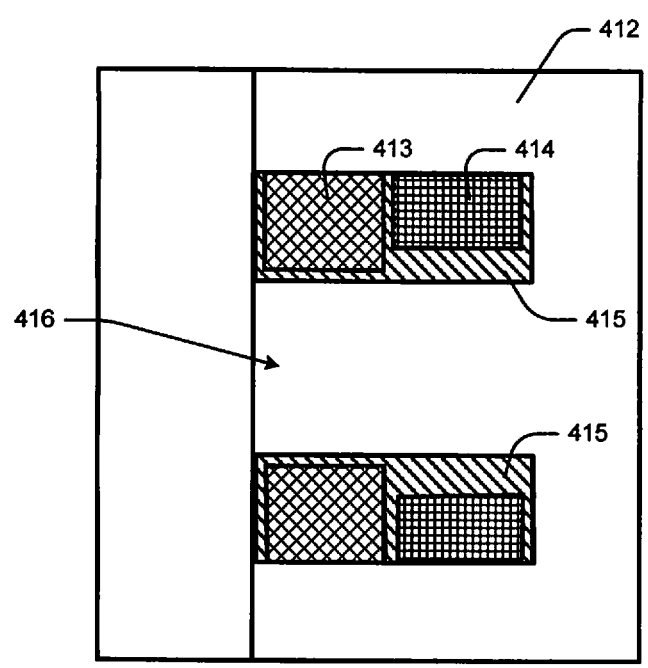

Various core lamination configurations for split bobbins of E-E and E-I type core geometries are shown in FIGS. 4A-4F. A typical core with an E-E geometry according to prior art is shown in FIG. 4A with the core laminations creating the primary and secondary winding windows 401 and 402. FIGS. 4B-4D show various E-E core lamination configurations according to the split core or bobbin embodiment shown in FIG. 3. FIG. 4E shows an E-I core lamination configuration according to the split bobbin embodiment shown in FIG. 3. FIGS. 4B, 4C and 4D show E-E transformer core laminations according to this embodiment, with the center legs 404, 406, 408 which hosts the primary windings 403, 405, 407 having increasingly large widths, and abutting the center legs of the E lamination which hosts the secondary winding by configuring the laminations with geometrically interlocking center leg segments 403, 405, 407.

FIG. 4F shows an embodiment with a standard E-I core configuration 412 with the center leg of the core 416 of a single width. In this embodiment, a split bobbin 415 provides a winding surface which separates the primary winding 414 further from the core center leg 416 than the secondary windings 413. Power capacity considerations may be necessary according to the magnetic properties of the core geometries for the embodiments in FIG. 4.

Figure 5:
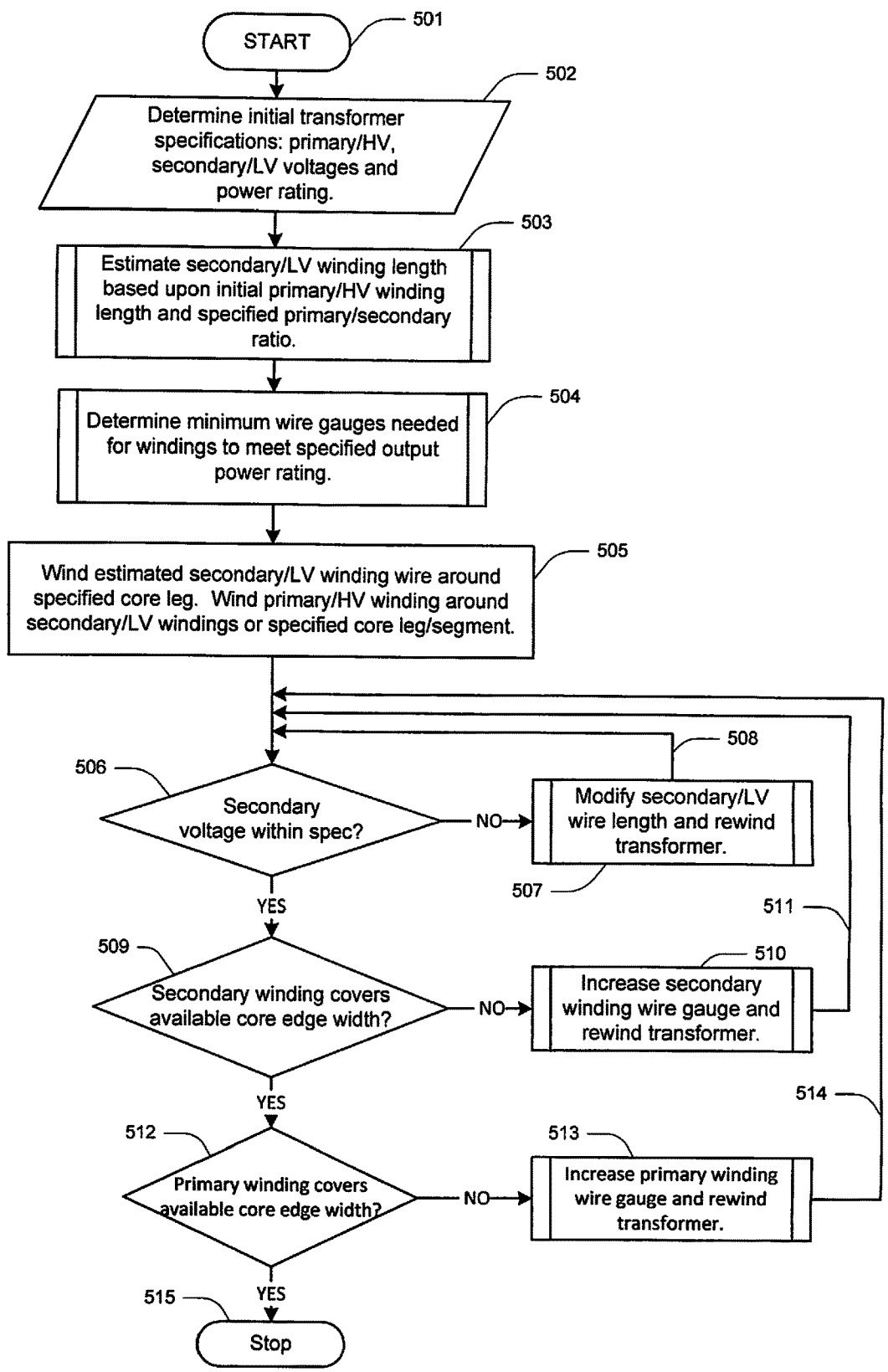
FIG. 5—Flow chart showing iterative design process for determining optimal winding length and wire gauge for power output.

FIG. 5 presents an embodiment which details a generalized iterative approach for optimizing transformer core windings in accordance with the present invention. Once started 501, the user determines the initial specifications or requirements for the desired step-down transformer 502, including the input, primary or high voltage, the output, secondary, or low voltage, and the power requirements for the transformer. Next 503, the secondary winding length Ls is estimated according to the primary VP and secondary voltage Vs requirements and the optimal primary winding length Lp according to the Faraday's law corollary such that Ls=Vs*Lp Np. Based upon the required power capacity of the transformer, the winding wire gauge (in mils) is determined according to the empirically derived relationship of 4.5 W/mil for copper and 7.37 W/mil for aluminum, for transformer output under load 504.

Next the iterative process for experimentally optimizing the winding lengths is initiated winding the estimated secondary winding around the given core segment, and then winding the optimal primary winding length around the secondary winding accordingly 505. Then output or secondary voltage is check against the specification requirements 506, and if not within specification, the secondary winding length is modified 507 and the transformer is rewound and tested again 508. If the secondary winding does not cover the winding window width 509, the gauge for the secondary winding is increased 510 to cover the window width and the transformer is rewound and retested 511. The last step for the iterative testing is to check that the primary winding covers the available winding window 512 and if available space remains, the gauge for the primary winding is increased 513, the transformer is rewound and retested. The process continues until the optimal winding lengths and wire gauges is determined 515.

Various alternative embodiments are available for the application of aspects of the invention, including increasing the axial distance from the core center for the primary winding as compared with the secondary winding for step-down (and step-up) transformers, including additional single and split bobbin laminated core geometries, as well as toroidal transformer cores.

The implications of the present invention's numerous potential configurations and embodiments are far reaching. The unexpected finding of improved power capacity and efficiency for transformers designed according to the various embodiments of the invention allow transformers to operate at lower temperatures, save energy, or operate at the same efficiency of existing conventional designs made with copper windings with the use of aluminum windings, reducing both the cost of the transformer and the weight.

Although the invention has been described in terms of the preferred and exemplary embodiments, one skilled in the art will recognize many embodiments not mentioned here by the disclosed of the included invention embodiments and the included drawings. Interpretation should not be limited to those specific embodiments disclosed in this specification.

The Commissioner is hereby authorized to charge any fees which may be required with respect to this application to Deposit Account No. 505949.

We claim:

1. A method for manufacturing a transformer comprising:
    configuring a magnetic core of a specified magnetic material defining a geometry with a space for a primary and a secondary winding,
    setting an initial primary winding length at a first length based on conventional transformer design criteria;
    determining a first length and gauge of said secondary winding according to a ratio of said specified primary voltage and said specified secondary voltage multiplied by a number of turns determined by the length of said primary winding length and optimized to utilize said space,
    adjusting iteratively said primary winding length without lengthening said primary winding length and iteratively adjusting first said secondary winding length and said primary winding length to reestablish said ratio;
    winding said secondary winding about a bobbin which engages said core;
    winding said primary winding about said bobbin outside of said secondary winding.

2. The method for manufacturing a transformer as in claim 1, wherein said winding of said secondary winding and the winding of said primary winding is about a split bobbin which laterally spaces the primary and secondary windings, wherein said primary winding minimal axial distance from an axial center of said selected core segment is greater than said secondary winding minimal axial distance from said axial center of said selected core segment.

3. The method as in claim 1 further comprising:
    adjusting the secondary windings to compensate for a voltage loss.

4. The method for manufacturing a transformer as in claim 1, wherein the transformer is a step-down transformer.

* * * * *